United States Patent

[11] 3,634,653

[72] Inventor Huel C. Tucker
St. Louis, Mo.
[21] Appl. No. 42,113
[22] Filed June 1, 1970
[45] Patented Jan. 11, 1972
[73] Assignee Monsanto Company
St. Louis, Mo.

[54] THERMOSTAT CIRCUIT FOR ELECTRONIC COMPARTMENTS
10 Claims, 2 Drawing Figs.

[52] U.S. Cl..................................................... 219/501,
219/499
[51] Int. Cl..................................................... H05b 1/02
[50] Field of Search............................................ 219/501,
499

[56] References Cited
UNITED STATES PATENTS
3,113,198 12/1963 Shinn ........................... 219/501 X
2,967,924 1/1961 Friend........................... 219/501

Primary Examiner—George Harris
Assistant Examiner—F. E. Bell
Attorneys—John D. Upham, Harold R. Patton and William J. Bethurum ABSTRACT: Disclosed is an electronic thermostat circuit including a differential amplifier stage which is biased by a bridge network having a thermistor and a set point resistor therein. An output power device, such as a power transistor, is DC coupled through an emitter-follower stage to the output of the differential amplifier stage and is conductively controlled by electrical signal variations at the output of the differential amplifier stage. The power device is mounted in a heat sink and dissipates sufficient heat therefrom to maintain a substantially constant temperature within a compartment housing the thermostat circuit. The thermostat circuit tracks changes of temperature inside the compartment and thereby tends to null the voltage at the output of the bridge network of the thermostat circuit.

INVENTOR
HUEL C. TUCKER
BY William J Bethurum
ATTORNEY

THERMOSTAT CIRCUIT FOR ELECTRONIC COMPARTMENTS

FIELD OF THE INVENTION

This invention relates generally to electronic temperature control circuitry and more particularly to a proportional-controlled electronic circuit for maintaining the temperature in small electronic compartments within close tolerances.

BACKGROUND OF THE INVENTION

For many applications involving various types of electronic gear which would normally be subjected to wide temperature variations, such electronic gear is mounted in highly insulated electronic compartments in an attempt to maintain the temperature of the compartment and the electronic gear substantially independent of temperature variations outside the compartment. For example, the temperature outside the compartment may vary from −40° to +100° C. and it may be desired to maintain the temperature inside the compartment at +25° C. or substantially room temperature. The electronic gear housed in these electronic compartments frequently includes components such as semiconductor devices having temperature sensitive PN-junctions, and these PN-junctions have offset junction voltages which vary several millivolts per degree centigrade change in ambient (inside compartment) temperature. Thus, the desirability of maintaining a substantially constant temperature inside the small compartment housing temperature sensitive electronic gear is obvious.

DESCRIPTION OF THE PRIOR ART

Heretofore, one technique for maintaining the temperature of small electronic compartments within a predetermined temperature range involved the use of on/off switches for periodically connecting and disconnecting a heater element to a power supply. For example, a mechanical on/off switch could be turned on by either electronic or electromechanical means when the temperature within the compartment dropped below a predetermined level. The on/off switch would then be maintained in its "on" position until the heater element had increased the compartment temperature to another higher temperature level representing the upper end of the compartment's temperature range. Using conventional temperature-sensing elements, the on/off switch could be electronically opened at the upper end of the range and the compartment would then cool off until the above cycle repeated itself. Frequently, a bimetallic temperature sensitive on/off switch was used to perform the above on/off switching function, and in this case, a separate temperature sensing element was not required.

The use of a mechanical on/off switch in the above described prior art thermostat circuit is inherently disadvantageous from a reliability standpoint, since the wear and failure of the mechanical moving parts of the switch limits the lifetime of the thermostat circuit and thus restricts the field of use of such circuits. Secondly, the prior art type of thermostat circuit described generally above normally includes circuitry operable to turn on the on/off switch at one end of a temperature range and turn off the switch at the other end of the temperature range. During the time that the on/off switch is in its "on" position, the heater element is energized and the compartment temperature is gradually increased as it moves from the lower to the upper end of the temperature range of interest. When the on/off switch is turned off, the compartment will then cool off from the upper to the lower end of the temperature range of interest. Thus, this prior art thermostat circuit did not maintain a constant temperature within the compartment being temperature controlled, and the disadvantage of this varying inside-compartment temperature has been described above.

SUMMARY OF THE INVENTION

The general purpose of this invention is to provide an electronic thermostat circuit which possesses advantages of similarly employed thermostat circuits, but does not possess the aforedescribed disadvantages. To attain this, the present invention utilized proportional, temperature-responsive biasing of a power device, so that this device conducts current through an associated power impedance to thereby dissipate heat as a function of the surrounding (inside-compartment) temperatures.

Accordingly, an object of the present invention is to provide a new and improved electronic thermostat circuit for maintaining the temperature in an enclosed compartment at a substantially constant value.

Another object of this invention is to provide a new and improved electronic thermostat circuit having fine proportional set point control and requiring no moving parts.

Another object of this invention is to provide a new and improved solid state electronic thermostat circuit of the type described which is easy to construct and reliable in its operation.

Briefly described, the thermostat circuit according to the present invention includes an input circuit comprising a differential amplifier in combination with a thermistorized bridge circuit. The current flowing in the differential amplifier is varied as a function of the temperature within the compartment enclosing the thermostat circuit. The bridge circuit includes a variable set point resistor, which together with a thermistor controls the conductivity of the differential amplifier. A slowly varying output voltage of the differential amplifier is coupled through an emitter follower stage to an output power device which is biased on a selected portion of its current-voltage transfer characteristic. The output power device controls the amount of current flowing through an associated power resistor which serves as the load impedance for the output power device. When the temperature in the compartment falls below a predetermined level, the change in resistance of the thermistor produces a corresponding change in voltage at the output of the differential amplifier. This voltage variation is coupled to the output power device to produce a change in current flowing in the output power device and its associated load impedance. The heat generated as a result of this change in current flow in the output power device and output power impedance tends to null the variable impedance bridge network as it stabilized the temperature in the enclosed compartment at a preselected level. This level is established in accordance with the resistance values of the thermostat circuit to be further described herein.

DRAWINGS

The above brief summary and other objects and novel features of this invention will become more fully apparent in the following description of the accompanying drawings wherein:

FIG. 1 is a block diagram representation of the thermostat circuit according to the present invention; and FIG. 2 is a schematic diagram representation of the thermostat circuit according to the present invention. Like reference numerals are used in FIGS. 1 and 2 to designate corresponding electronic components therein.

DETAILED DESCRIPTION OF THE INVENTION

Figure 1:
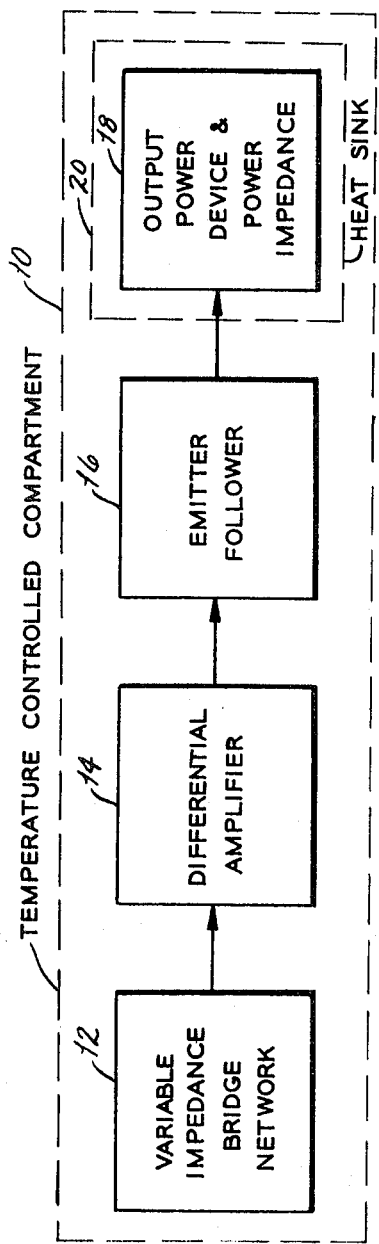
Figure 2:
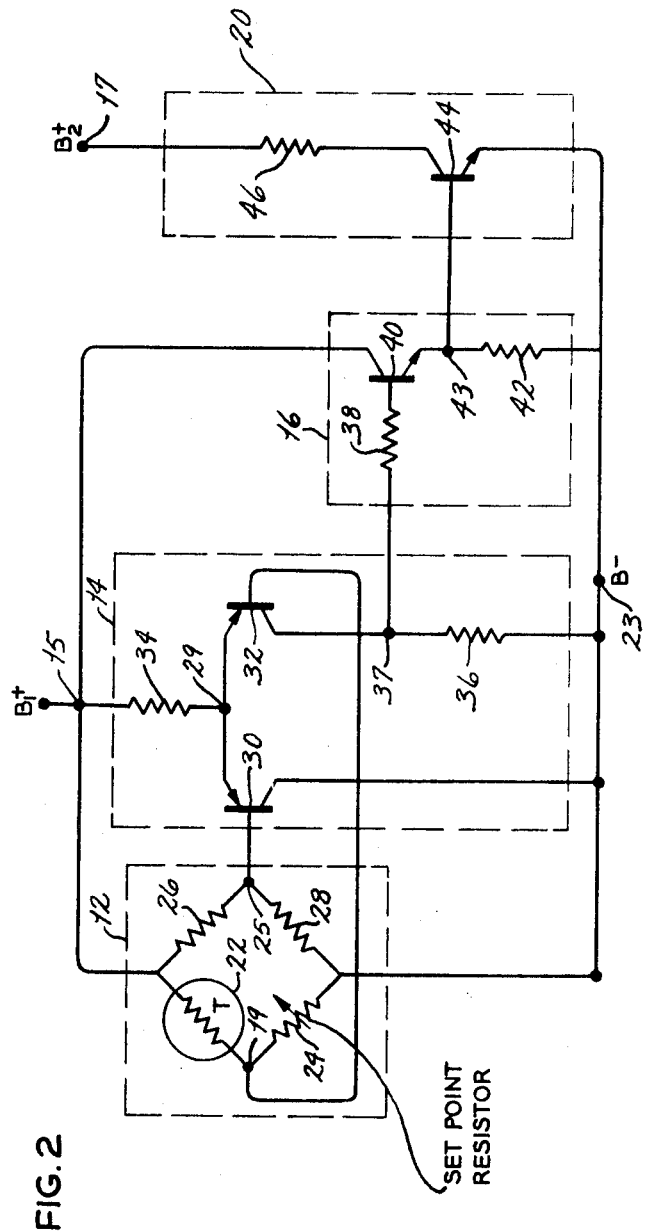

Referring to FIGS. 1 and 2 in detail, there is shown a temperature controlled compartment 10 wherein the temperature is to be stabilized at a substantially constant value in accordance with the present invention. FIG. 1 includes a variable-impedance bridge network 12 which provides an input electrical control signal to a differential amplifier 14. In response to this electrical control signal, the differential amplifier 14 provides a slowly varying output voltage which is coupled through the emitter-follower state 16 to the output power stage designated generally as 18 in FIG. 1. The output stage 18 includes an output power device and its associated power impedance which are both mounted in a conventional manner on a heat sink 20, and the heat sink 20 is designed to rapidly dissipate heat by radiation into the surrounding ambient. The heat is generated as a result of the voltage-current power product in the power impedance 46 (FIG. 2) and its associated output NPN-power transistor 44 to be further described. Referring to FIG. 2, variable-impedance bridge network 12 includes a thermistor 22 in one leg thereof which is connected between a first power supply terminal 15 and a first bridge node 19. A set point resistor 24 is interconnected between the first bridge node 19 and a second power supply terminal 23. The bridge node 19 is directly connected to the base of one PNP-transistor 32 in the differential amplifier stage 14. First and second fixed bridge resistors 26 and 28 are connected, respectively, as shown between the power supply terminals 15 and 23 and a second bridge node 25, and node 25 is directly connected to the base of the other differential amplifier PNP-transistor 30.

The differential amplifier stage 14 further includes a DC level-shifting and current-limiting resistor 34 connected between the $B_1+$ power supply terminal 15 and the common emitter node 29 of the two differential amplifier PNP-transistors 30 and 32. A single-collector load resistor 36 interconnects the collector of PNP-transistor 32 and the B− power supply terminal 23, and the collector of PNP-transistor 30 is connected directly to the B− power supply terminal 23. Stages 12 and 14 which are described above comprise the input circuit means for the electronic thermostat circuitry embodying the invention.

The slowly varying signal voltage which is developed across the load resistor 36 is coupled through a current-limiting resistor 38 to the base of the emitter-follower NPN-transistor 40 in the emitter-follower stage 16. The emitter-resistor 42 establishes the base bias potential at the base of the output NPN-transistor 44, and the collector of the NPN-power transistor 44 is connected through its power dissipating resistor 46 to a second $B_2+$ power supply terminal 17. The two power supplies $B_1+$ and $B_2+$ provide the operating voltages of the circuit portions of the thermostat circuit to which they are connected, but a single supply (not shown) can be used as an alternative to the two supplies. In the latter case, it may be desired to use appropriate DC level-shifting resistors with the single supply.

Stages 16 and 18 described above comprise the output circuit means for the electronic thermostat circuitry embodying the present invention.

DESCRIPTION OF OPERATION

Assume that it is desired to maintain the temperature in the compartment 10 at a substantially constant level $T_1$ and that the temperature in the compartment 10 has just dropped below this value to a temperature $T_2$. Since the thermistor 22 has a negative temperature coefficient of resistance, the resistance value of thermistor 22 increases with a decrease in temperature. Therefore, the corresponding increase in voltage drop across the thermistor 22 produces a decrease in the voltage at base node 19 of the differential amplifier transistor 32. This decrease in base voltage at the base of PNP-transistor 32 produces a corresponding increase in the collector current of PNP-transistor 32 and also an increase in the voltage drop across collector load resistor 36 of transistor 32.

This increase in the collector voltage at the collector node 37 of PNP-transistor 32 is coupled through the current limiting resistor 38 to the base of NPN-transistor 40 to increase the emitter current flowing in the emitter-follower transistor 40. The emitter current flowing in transistor 40, less the relatively small current drain through emitter-follower resistor 42, is multiplied by the common emitter current gain (beta) of the output power transistor 44. This latter action produces an increase in power generation and heat dissipation in the heat sink 20 and therefore raises the temperature in the compartment 10 and the ambient temperature surrounding the thermistor 22. When the temperature of thermistor 22 is raised, its resistance value is again lowered as it tends to null the variable impedance bridge network 12, with the null time being variable in accordance with the value of the set point resistor 24. In operation, the bridge network 12 is never precisely nulled or balanced under varying inside-compartment temperature conditions The power resistor 46 which is mounted in the heat sink 20 may advantageously be a wire-wound resistor having ceramic insulation thereon which is a good heat conductor and will radiate heat from the resistor 46 to the heat sink 20 at a relatively high efficiency. The heat sink 20 may be constructed typically of aluminum, copper, alumina, beryllia, diamond, or other material having a good thermal conductivity.

In operation, the combination of the heat sink 20, power transistor 44 and the power resistor 46 is capable of maintaining an electronic inside-compartment temperature at a constant value for outside compartment temperatures which drop as low as −40° C. The thermostat circuit according to the present invention is designed primarily to track decreasing temperature changes below a fixed preselected constant-inside compartment temperature. The resistance of the thermistor 22 will increase for cold temperature tracking down to the vicinity of −40° C. to an ohmic resistance value sufficient to produce a resultant increase in current flowing through the power resistor and power transistor 44 to stabilize the inside compartment temperature at the said fixed preselected temperature, such as 25° C. When the inside-compartment temperature begins to increase from −40° C. to the preselected constant temperature value, say +25° C., then the thermistor 22 will undergo a decrease in resistance and in this sense will track increasing temperature variations inside the electronic compartment 10. However, after the outside-compartment temperature increases to a given level, then the insulative qualities of the insulating material (not shown) of the compartment 10 must be primarily relied upon to stabilize the inside-compartment temperature. Stated in another way, the limitation on tracking of increasing inside-compartment temperatures is limited when the power transistor 44 turns off. This happens when the bridge 12 unbalances sufficiently to reduce the base current of transistor 44 to zero. In a circuit of the type described which has been actually built in accordance with the table of values given below, the output power capability typically ranges from 100 milliwatts to 10 watts, and the circuit may be operated to dissipate up to 40–50 watts of power in the output stage 18 of the circuit.

The variable set point resistor 24 provides a positive set point control fro the thermostat circuit similar to the set point control of the well-known closed loop servosystem. By merely adjusting the value of the variable set point resistor 24, the temperature level within the compartment 10 may be set at a selected value within the temperature range capability of the thermostat circuitry described.

Thus, the above-described electronic thermostat circuit operates with set point proportional control, and as the temperature outside the compartment 10 continues to drop to lower and lower levels, the collector current of power transistor 44 is continuously increased. The corresponding power generated in the heat sink 20 and its resultant heat radiation into the surrounding ambient within the compartment 20 is just enough to offset the effect of the decrease in temperature outside the compartment 10 and stabilize the inside-compartment 10 temperature at a fixed value.

A substantially linear relationship exists between the change in resistance of the thermistor 22 and the change in power and heat dissipation in the heat sink 20. Such linear relationship may be explained as follows: The power generated by the power resistor 46 and the power transistor 44 is equal to the $B_2+$ voltage at power supply terminal 17 multiplied by the current flowing through power resistor 46 and into the collector of NPN-power transistor 44. The NPN-power transistor 44 is normally biased on a substantially constant (flat) portion of its well-known collector current vs. collector to emitter voltage ($I_C$ vs. $V_{CE}$) characteristic. This characteristic which is well known in the art rises sharply with lower values of $V_{CE}$ and then at the knee of the characteristic begins to flatten off and thereafter exhibit substantially constant $I_C$ for further increasing values of $V_{CE}$. The transistor 44 has a plurality of these characteristic curves, each of which flatten out as described above and each of which correspond to a given value of transistor 44 base current, $I_B$. A load line for the combination transistor 44 and power impedance 46 intersects this family of $I_C$ vs. $V_{CE}$ curves, and as the transistor 44 base current is increased or decreased, then the value of $I_C$ varies substantially linearly. That is, the $I_B$ vs. $I_C$ dynamic transfer characteristic of the NPN-power transistor 44 is a substantially linear variation. Therefore, since the voltage $B_2+$ across the resistor 46-transistor 44 combination remains substantially constant, and since the base and collector currents of transistor 44 undergo substantially linear variations during the circuit operation previously described, then the power generated in the heat sink 20 is a substantially linear function of the resistance of the thermistor 22.

The table of values below is given by way of illustration only and is not intended to limit the scope of the present invention. Said values represent those used in a circuit of the type described which has been actually built and successfully operated.

| COMPONENTS | VALUE OR TYPE |
| --- | --- |
| Thermistor |  |
| 22 | 5 kilohms at set point temp. |
| Set Point Resistor |  |
| 24 | 20 kilohms |
| Resistor |  |
| 26 | 5 kilohms |
| 28 | 20 kilohms |
| 34 | 4 kilohms |
| 36 | 10 kilohms |
| 38 | 5 kilohms |
| 42 | 4 kilohms |
| 46 | 40 ohms, 20 watts maximum rated power dissipation |
| Transistor |  |
| 30, 32 | PNP |
| 40 | NPN |
| 44 | NPN—rated 100 miliwatts to 10 watts |

The invention described above is not limited to the particular embodiment thereof shown in FIG. 2 of the drawings. There are various circuit modifications that may be made to the particular bridge circuit 12, differential amplifier 14, emitter-follower 16, and the output stages 18 without departing from the scope of this invention. For example, and within the scope of this invention, a thermistor having a positive temperature coefficient of resistance may be utilized by interchanging the respective positions of the thermistor 22 and set point resistor 24.

Another example of a modification to the circuit embodiment of FIG. 2 which is within the scope of this invention is the substitution of a vacuum tube pentode or a field effect transistor for the NPN-power transistor 44. Such substitution would require some circuit modifications which are within the skill of the art. Both the vacuum pentode and the field effect transistor are known to have output electrode current vs. input-output electrode voltage characteristics which are similar to the $I_C$ vs. $V_{CE}$ characteristic of the bipolar transistor. That is, these current-vs.-voltage characteristics rise rather sharply in current for low applied voltages and then begin to flatten out at a substantially constant current for further increases in voltage up to a given voltage limit. In the case of the vacuum tube pentode, the plate current vs. plate voltage characteristic is one that rises rather sharply and flattens out at a substantially constant value of plate current, with the plate current being different for different values of grid voltage. Thus, it would be obvious to one skilled in the art that the output circuitry of the present invention could be modified to utilize a vacuum tube pentode as the output power device instead of the NPN-power transistor 44. Similarly, the drain current vs. source-to-drain voltage characteristic of a field effect transistor (FET) is similar to that of a vacuum tube pentode, and the field effect transistor has a family of these curves, with each curve in the family corresponding to a different value of gate voltage applied to the FET. Thus, it is obvious that the FET or the vacuum tube pentode could be utilized in substitution for the output device 44 and have its output current linearly varied as a function of input grid or gate voltage, respectively.

A further modification to the circuit embodiment of FIG. 2 which is within the scope of the present invention is to connect the power transistor 44 directly to the $B_2+$ supply terminal 17 and omit the load resistor 46. The resistor 46 is normally desired to limit the transistor 46 collector current 44 to a maximum value. However, as long as the product of the $B_2+$ supply voltage and the transistor 46 collector current does not exceed the maximum power rating of the power transistor 46, then the load resistor 46 is not required. In this alternative embodiment of the invention (not shown), the collector current of the power transistor 44 can be effectively controlled by limiting the maximum allowable base current of transistor 44 by way of the previously described current-limiting resistors 34 and 38.

I claim:

1. Electronic thermostat circuitry comprising:
   a. temperature-responsive input circuit means operative to provide an output electrical signal which is a function of ambient temperature variations,
   b. output circuit means including an active electroresponsive heat generating and amplifying device coupled to said input circuit means and responsive to said output electrical signal to vary the heat generated by said active device and thereby provide a compensating temperature change at the location of said thermostat circuitry, and
   c. a heat sink mounted in thermally conductive relationship to said heat generating and amplifying device for rapidly transferring heat from said device to the surrounding ambient.

2. Circuitry defined in claim 1 wherein said input circuit means includes:
   a. a bridge circuit having a thermistor and a set point resistor interconnecting one circuit node, and
   b. a differential amplifier connected to said one node within said bridge circuit and operative to conduct a variable current therethrough which is dependent upon the resistance value of both said set point resistor and said thermistor.

3. Circuitry defined in claim 1 wherein:
   a. said active device is an output power transistor coupled to receive said variable electrical signal from said input circuit means,
   b. a power impedance interconnecting said power transistor and a voltage supply terminal, said power transistor and said power impedance dissipating heat therefrom as a function of the current flowing therethrough, and
   c. a heat sink mounted in thermally conductive relationship to said power impedance and said power transistor for transmitting heat by radiation from said power impedance and said power transistor to a compartment surrounding said thermostat circuitry, thereby providing temperature tracking within said compartment of decreasing temperatures outside said compartment.

4. Circuitry defined in claim 3 wherein said input circuit means includes:
   a. a bridge network including a thermistor and a set point resistor interconnected between power supply terminals, respectively, and a bridge circuit node, and
   b. a differential amplifier connected to said bridge circuit node and responsive to voltage changes thereat for varying the current through said differential amplifier and producing a variable signal voltage at the output of said differential amplifier.

5. The circuitry defined in claim 5 wherein said output circuit means further includes an emitter-follower stage interconnecting an output node of said differential amplifier and said output power transistor for establishing desired bias conditions at the input of said power transistor and biasing same on a substantially linear portion of its current-voltage transfer characteristic.

6. Electronic thermostat circuitry comprising
a. temperature-responsive input circuit means operative to provide an output electrical signal which is the function of ambient temperature variations,
b. a heat generating and amplifying power device coupled to said input circuit means and responsive to said output electrical signal to vary the heat generated therefrom in accordance with the variations in the current-voltage product of the voltage applied across said power device and the varying current flowing therethrough, and
c. a heat sink mounted adjacent to said power device and in thermally conductive relationship thereto for transmitting heat by radiation from said power device and through said heat sink to a surrounding compartment to thereby provide temperature tracking within said compartment of temperature changes outside said compartment.

7. Circuitry defined in claim 6 which further includes a power impedance connected between said power device and a voltage supply terminal and limiting the current in said power device while dissipating power and heat simultaneously with said power device, said power device and said power impedance mounted in heat conductive relationship in a heat sink to rapidly dissipate heat into the surrounding ambient.

8. In a temperature control circuit of the type having a temperature-responsive bridge network for generating a variable control voltage as a function of ambient temperature and an amplifier connected to the bridge circuit and responsive to an unbalancing of the bridge network for providing a control potential to a temperature control element, the improvement comprising an output heat-generating power-amplifying device included within said control element and coupled to receive said control potential, said heat-generating power-amplifying device connected between a voltage supply terminal and point of reference potential and adapted to be mounted in heat conductive relationship in a heat sink for rapidly transferring heat therethrough into the surrounding ambient to track temperature changes therein.

9. Circuitry defined in claim 8 which further includes a power impedance interconnected between said power device and said voltage supply terminal for limiting the current flow into said power device while simultaneously generating heat which is also transferred through said heat sink into the surrounding ambient.

10. A method for controlling the temperature within a compartment which comprises the steps of:
a. providing within said compartment an electrical variations, proportional to the amplitude of said electrical signal,
c. transmitting said thermal energy through a suitable heat sink, and
d. radiating said thermal energy from said heat sink into said compartment to track said temperature variations and thereby null said temperature within said compartment to or toward a chosen set point temperature.

* * * * *

PO-1050
(5/69)

UNITED STATES PATENT OFFICE
CERTIFICATE OF CORRECTION

Patent No. 3,634,653      Dated January 11, 1972

Inventor(s) Huel C. Tucker

It is certified that error appears in the above-identified patent and that said Letters Patent are hereby corrected as shown below:

Column 7, line 3, delete "5" and insert therefor --4--.

Column 8, Claim 10, cancel subparagraph (a) and insert therefor:

--a. providing within said compartment an electrical signal which is proportional to ambient temperature variations,
b. converting said electrical signal to thermal energy proportional to the amplitude of said electrical signal, --.

Signed and sealed this 14th day of November 1972.

(SEAL)
Attest:

EDWARD M. FLETCHER, JR.
Attesting Officer

ROBERT GOTTSCHALK
Commissioner of Patents